O. ANDERSON.
DRAFT RIGGING.
APPLICATION FILED NOV. 9, 1911. RENEWED AUG. 1, 1914.
1,134,576.
Patented Apr. 6, 1915.
5 SHEETS—SHEET 4.
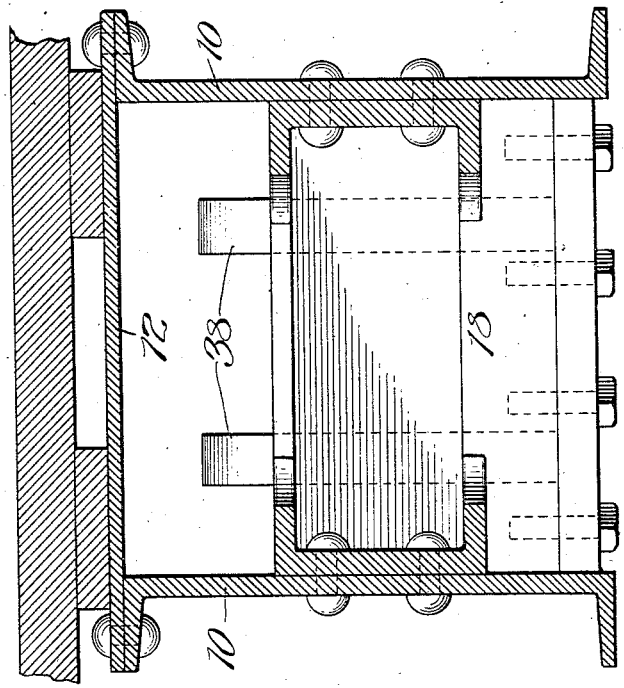
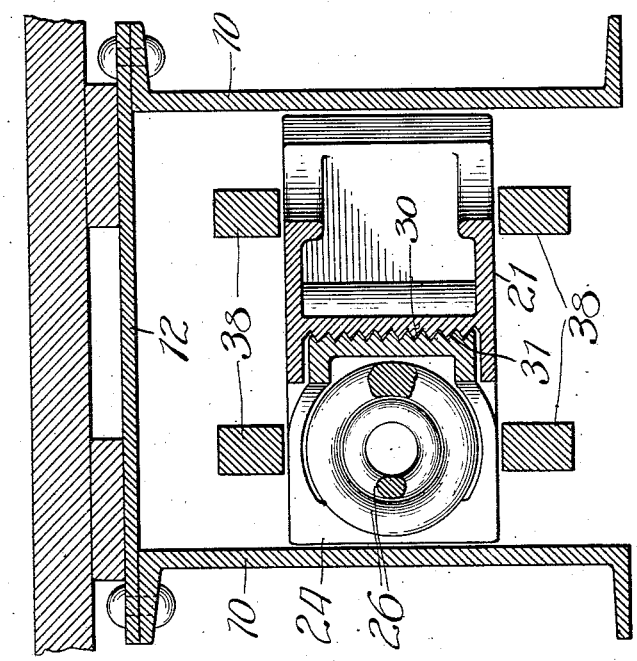

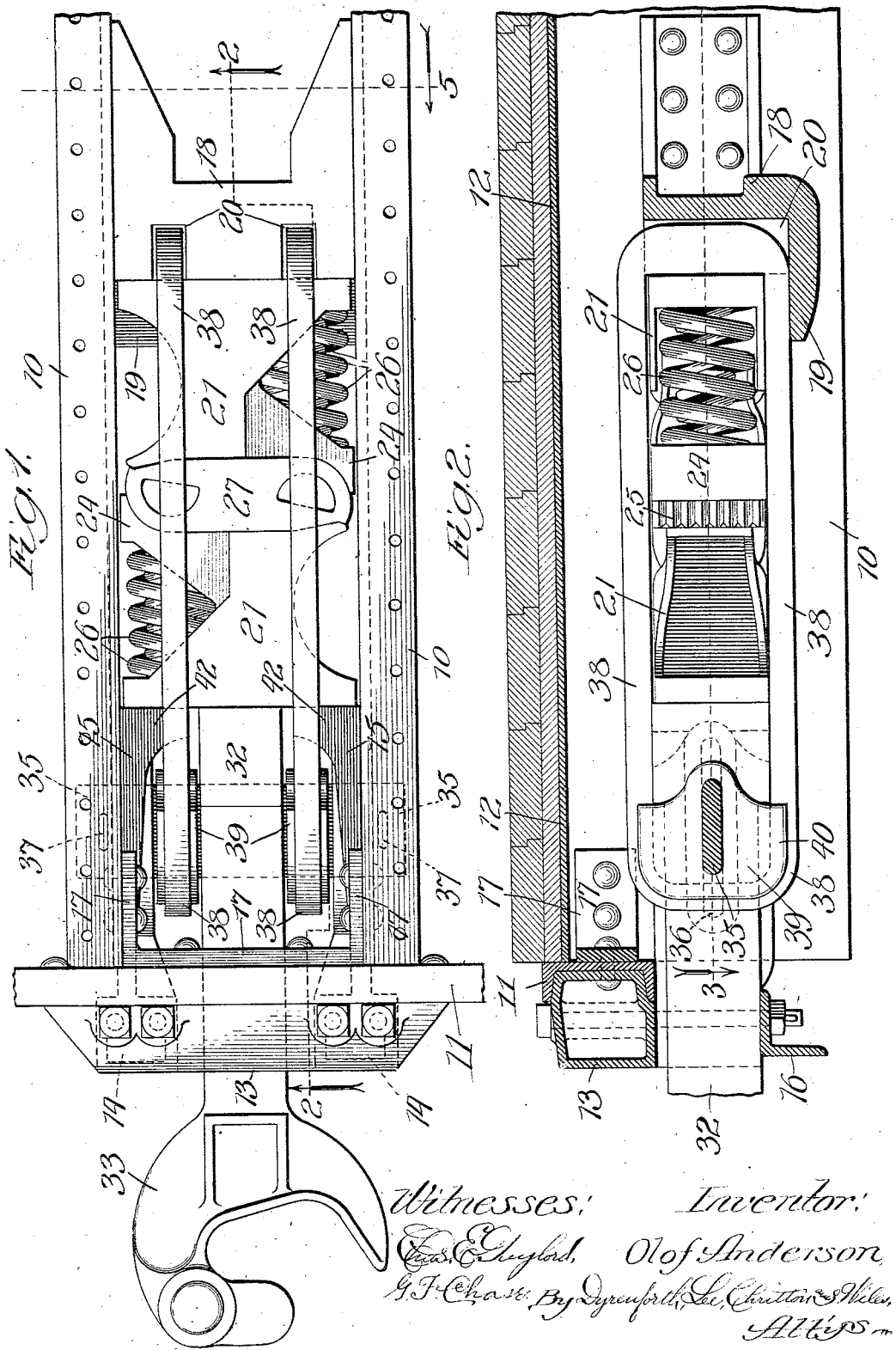

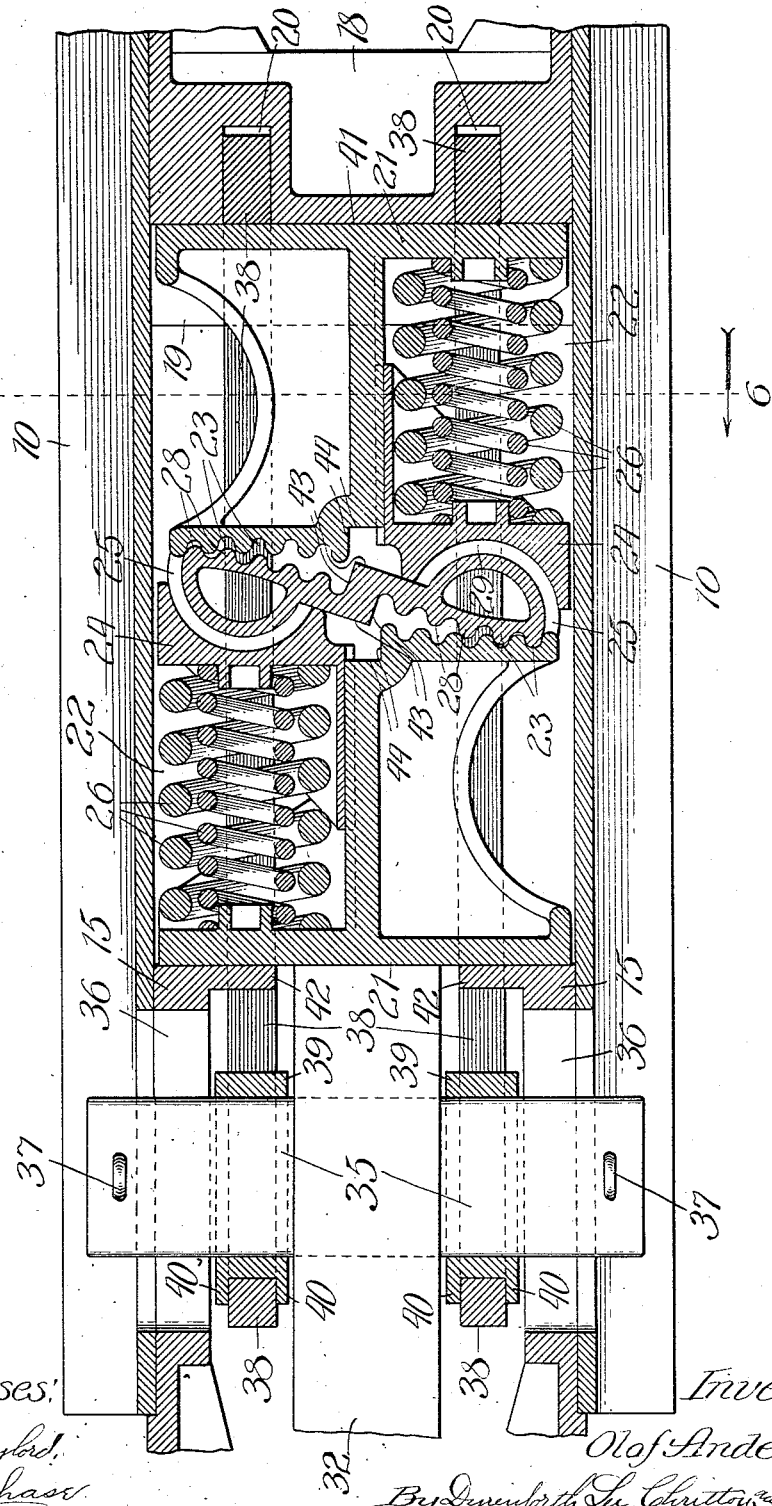

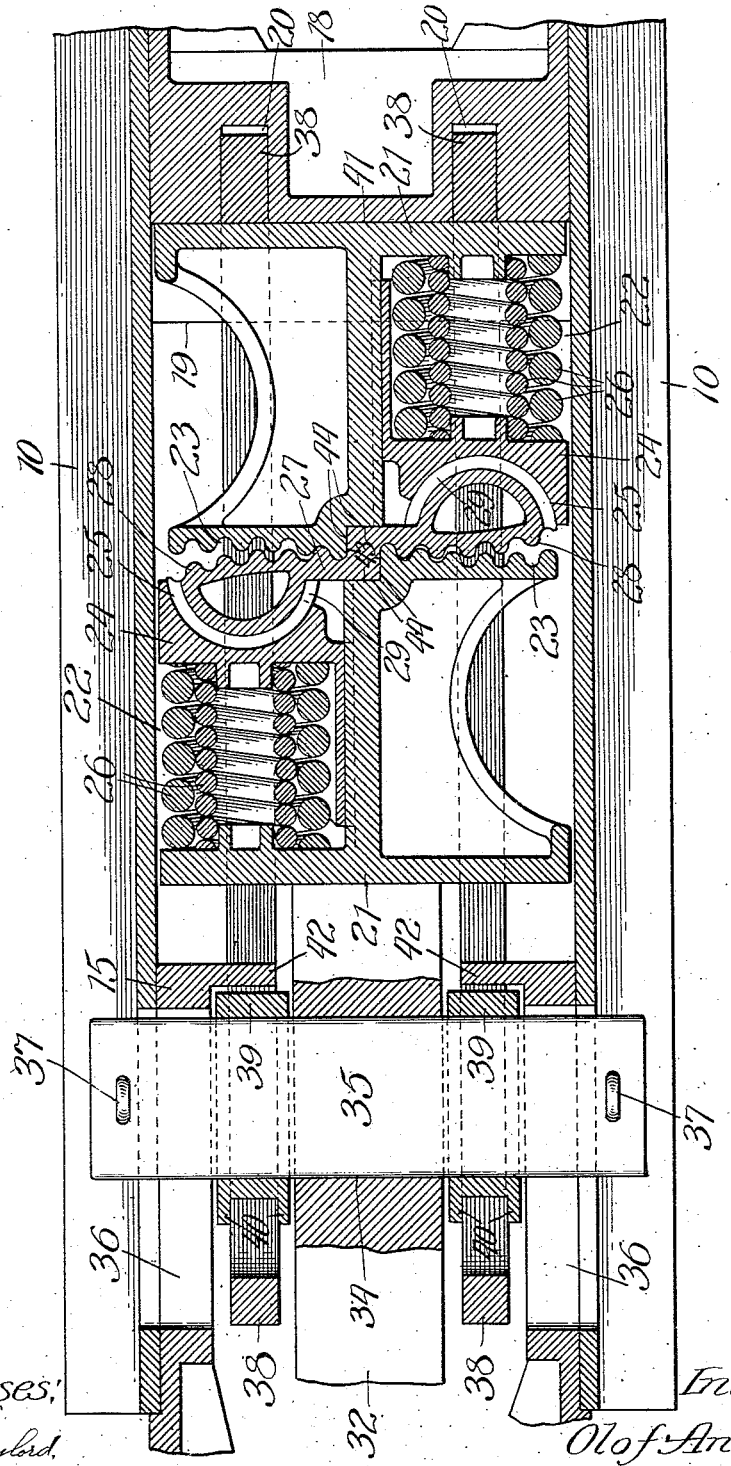

O. ANDERSON.
DRAFT RIGGING.
APPLICATION FILED NOV. 9, 1911. RENEWED AUG. 1, 1914.
1,134,576.
Patented Apr. 6, 1915.
5 SHEETS—SHEET 5.
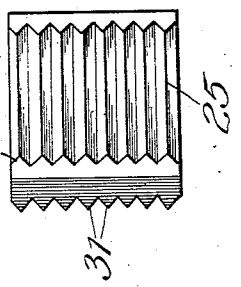
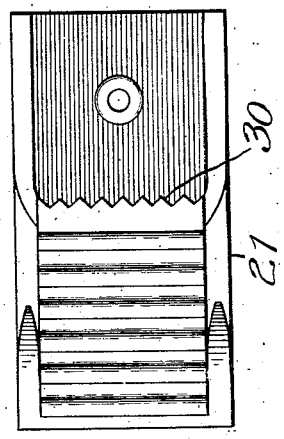
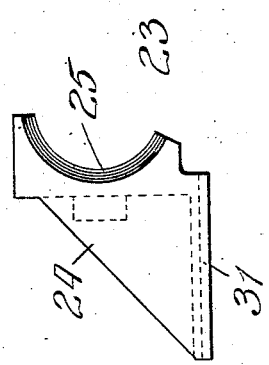
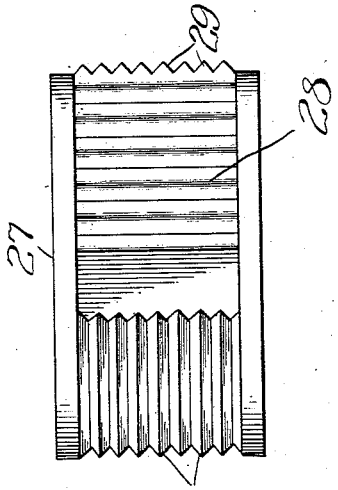
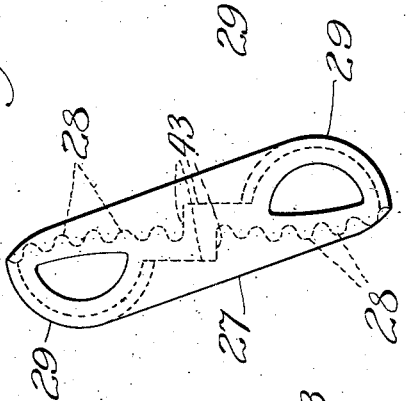
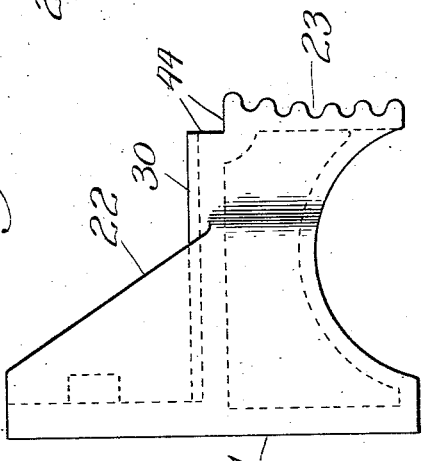
Witnesses:
Inventor:
Olof Anderson,

UNITED STATES PATENT OFFICE.

OLOF ANDERSON, OF CHICAGO, ILLINOIS, ASSIGNOR, BY MESNE ASSIGNMENTS, TO D. E. TOWN, OF CHICAGO, ILLINOIS.

DRAFT-RIGGING.

1,134,576.     Specification of Letters Patent.     Patented Apr. 6, 1915.

Application filed November 9, 1911, Serial No. 659,277. Renewed August 1, 1914. Serial No. 854,558.

*To all whom it may concern:*

Be it known that I, OLOF ANDERSON, a citizen of the United States, residing at Chicago, in the county of Cook and State of Illinois, have invented a new and useful Improvement in Draft-Riggings, of which the following is a specification.

My invention relates to improvement in draft-riggings for railway-cars; my object being, broadly stated, to provide draft-gear supporting-means of simple, strong and durable construction which will enable the draft-gear to be readily removed and replaced.

My present improvements are well adapted for combination with the friction draft-gear herein illustrated (which is described and claimed in Letters Patent No. 954,071, granted to me April 5, 1910) and serve not only to support the same in such a way that it may be conveniently removed and replaced when repairs are necessary, but to coöperate with and enhance the efficiency of the draft-gear in use.

In the accompanying drawings Figure 1 is a broken plan view of the end and center sills of a freight-car showing my improved draft-rigging, with its moving parts in normal position; Fig. 2, a section on irregular line 2—2 in Fig. 1; Fig. 3, an enlarged plan section taken on line 3 in Fig. 2; Fig. 4, a view similar to Fig. 3, but showing the moving parts at the limit of their movement under buffing compression; Fig. 5, an enlarged section on line 5 in Fig. 1; Fig. 6, a section on line 6 in Fig. 3; Figs. 7 and 8, plan and face views, respectively, of one of two similar spring-caps; Figs. 9 and 10, plan and face views, respectively, of one of two similar follower-blocks; and Figs. 11 and 12, plan and face views, respectively, of a rocking-lever.

The numerals 10, 10 designate the center, or draft, sills, and 11 the end-sill of a steel car-underframe in connection with which my improvements are herein illustrated. In the underframe construction shown the sills 10 are tied together by a top-plate 12, which, with said sills, forms a three-sided draft-gear housing open at the bottom. Fitting against the end-sill 11 and ends of the draft-sills 10, and extending into the draft-gear housing is a boxing, as shown, formed with hollow top and side chafing-blocks 13 and 14, respectively, which are cast integral with lugs 15 and have bolted thereto the draw-head-supporting chafing-plate 16. The top chafing-block 13 is riveted to the end-sill 11 and end-sill brace 17, and the lugs 15 fit and are firmly secured against the inner faces of the sills 10. Fitting between and riveted to the sills 10 is a rear stop or block 18 formed with a lower cross-extending platform 19 and with sockets 20.

The combined spring and friction draft-gear, as I now prefer to construct it, and as herein shown, differs but slightly from that illustrated in my aforesaid Letters Patent. It consists of the companion, similarly-constructed, follower-blocks 21, each formed on one side with a spring-holding pocket 22 and at its opposite side with a fluted bearing-face 23. Sliding in each of the pockets 22 is a spring-cap 24 having a segmental, preferably concave, bearing-face 25. In the pockets are the springs 26; and interposed between the follower-blocks is a rocking-lever 27 having fluted faces 28, 28 conforming to the fluted faces 23, and segmental, preferably convex, faces 29 conforming to the segmental faces 25 of the spring-caps. In the present construction the bearing-faces 25, 29 of the spring-caps and lever are provided with horizontally-extending serrations at which they intermesh, and the surfaces 30 of the follower-blocks and surfaces 31 of the spring-caps are also serrated so that they intermesh. The object of serrating the faces 25, 29, 30 and 31 is to increase the areas of the friction faces they present and also to prevent relative movement or slipping of the parts in the vertical direction.

In the shank 32 of the drawbar-head 33 is an opening 34 for a key 35. The key at opposite ends passes through and beyond elongated coincident slots or openings 36 in the webs of the sills 10 and lugs 15. The key fits tightly through the opening 34, but slides freely in the openings 36 in the horizontal plane longitudinally of the car, and is held against withdrawal by pins or cotters 37.

The reference numerals 38, 38 designate a pair of draft-yokes forming guides and supports for the follower-blocks 21 and attendant draft-gear mechanism. At their rear ends the yokes rest upon the shelf or support 19 and play in the slots 20. In the forward end-portion of each yoke is a longitudinally-movable thimble 39 held against removal from the yokes by flanges 40 and provided with openings through them conforming in size to the key 35 and corresponding opening 34 through the draw-bar. The key 35 passes through the thimbles in a manner to hold the same in rigid relation to the draw-bar, and it also operates, through the thimbles, as one support for the forward ends of the yokes 38. The key and thimbles move together and may slide in the yokes a distance equal to the distance of backward movement permitted by the draft-gear under buffing strain.

The draft-gear springs 26 are slightly compressed, causing the rear follower-block 21 to bear normally against the face 41 of the rear stop or block 18, and the forward follower-block 21 to bear normally against the inner end of the draw-bar 32 and against the forward stops formed by the inwardly projecting, flanged ends 42 of the lugs 15. The stops 42 correspond in width with and extend into the openings of the yokes 38, so that the yokes slide against the upper and lower surfaces of said stops to receive support and steadiness therefrom, as well as from the key 35 and thimbles 39. As the parts are assembled the yokes 38 extend in the planes of the central lines of the draft-springs 26. When buffing strain is exerted against the draw-bar its shank 32 presses the forward follower-block backward, rocking the lever 27 from normal position (Fig. 3) in the direction of the position illustrated in Fig. 4, whereby the convex serrated faces 29 of the lever turn in the serrated sockets, or concave faces 25, of the spring-caps 24. The spring-caps are thus retracted against the resistance of the springs 26, the strain being against the rear stop 18. The resistance against movement of the follower-blocks, one toward the other, is that of the springs 26, the friction against each other of the faces 25, 29 and, in a measure, the friction between the surfaces 30, 31. In this movement, under buffing strain, the key 35 is moved in the direction of the rear ends of the slots or openings 36 and the thimbles 39 are slid in the yokes 38 while the latter remain stationary. When the draw-bar is subjected to pulling strain the key 35 presses the thimbles 39 against the forward ends of the yokes and slides the latter, in the sockets 20, and the rear follower-block 21 in the forward direction, thereby rocking the lever 27, as before, to compress the spring-caps, the strain being against the stops 42. Thus there is the same spring and frictional resistance both to the buffing and pulling movements of the draw-bar, and the distance of travel in either direction from normal is the distance of swing of the lever 27 limited by the contact of the shoulders 43, on the lever, with the shoulders 44 of the follower-blocks, as shown in Fig. 4. The distance of travel of the gear under pulling strain is less than the depth of the sockets 20, so that the yokes never leave the latter. In the return movement of the parts, as strain is relieved, the friction faces between the moving parts resist too sudden expansion of the springs and thus operate, in effect, largely to cushion any jar of the shank 32 against the forward follower-block after a pulling strain.

In case of injury to a draw-bar it may be readily renewed by simply drawing out the key 35, which completely frees the shank from the draft-gear mechanism, and reinserting the key when the new draw-bar is placed in position. In the event that the draft-gear requires repair or replacement it is only necessary to remove the key and drawbar, swing the yokes at their forward ends toward each other, to free them from the projections or stops 42, and then permit the yokes with the entire draft-gear mechanism to drop out. In replacing the gear it is assembled in the yokes and compressed slightly; the yokes are then passed at their rear ends onto the shelf 19 and into the sockets 20, and then raised at their forward ends and spread to receive the stops or projections 42. The springs are then released, to permit the follower-blocks to expand against the stops 18, 42, and the draw-bar and key replaced, all of which can be very quickly accomplished.

The foregoing description is intended to convey a clear understanding of my improvements in what I now believe to be the best form of their embodiment, and no undue limitation should be understood therefrom. It is my intention to claim all that is novel in my invention, and that the claims shall be construed as broadly as the prior state of the art may warrant.

What I claim as new and desire to secure by Letters Patent is—

1. In a draft-rigging, the combination with the draft-sills and draw-bar, of forward, inwardly projecting stops on the draft-sills, a rear stop and platform carried by said sills, guide-slots in the draft-sills, a key-opening through the draw-bar, a removable key extending through said key-opening and resting and sliding in said guide-slots, a pair of yokes at their forward ends resting and sliding on said forward stops and having a sliding connection with said key and resting at their rear ends slidably on said shelf, and a draft-gear having forward and rear follower-blocks slidably supported in said yokes and confined between said forward and rear stops.

2. In a draft-rigging, the combination with the drawt-sills and draw-bar, of a forward stop on the draft-sills, a rear stop and platform carried by said sills, guide-slots in the draft-sills, a key-opening through the draw-bar, a removable key extending through said key-opening and resting and sliding in said guide-slots, thimbles on the key at opposite sides of the draw-bar, a pair of yokes extending at their forward end-portions around and slidably engaging with said thimbles and resting at their rear end-portions slidably on said shelf, and a draft-gear having forward and rear follower-blocks supported by and slidable in said yokes and confined between said forward and rear stops.

3. In a draft-rigging of the character set forth, the combination with the draft-sills and drawbar, of forward stops on the sills at opposite sides of the drawbar, a rear stop on the sills having a platform and guide-sockets, a draft-gear having opposed forward and rear follower-blocks, and a pair of yokes extending around the follower-blocks, at their rear ends resting slidably on said platform and working in said guide-sockets, at their forward ends engaging with the drawbar, and supporting the said draft-gear between said forward and rear stops.

4. In a draft-rigging of the character set forth, the combination with the draft-sills and drawbar, of forward stops on the sills at opposite sides of the drawbar, a rear stop on the sills having a platform and guide-sockets, a draft-gear having opposed forward and rear follower-blocks, and a pair of yokes extending around the follower-blocks, at their rear ends resting slidably on said platform and working in said guide-sockets, at their forward ends detachably engaging with the drawbar and slidably embracing the said forward stops, and supporting the said draft-gear between said forward and rear stops.

5. In a draft-rigging of the character set forth, the combination with the draft-sills, of a drawbar having a shank provided with a key-opening through it, forward and rear stops on the draft-sills, a draft-gear having opposed forward and rear follower-blocks between said stops, a pair of draft-yokes extending around the follower-blocks and slidably supported at their rear ends between said sills, thimbles slidably mounted in the forward ends of the draft-yokes, and a key passing through said key-opening and engaging said thimbles.

6. The combination of the draft sills having coincident elongated guide-openings, inwardly-projecting forward stops, rear stops provided with a platform and guide-sockets, a draft-gear confined between the forward and rear stops, a drawbar provided with a key-opening, draft-yokes, at opposite sides of the drawbar, extending around and supporting the draft-gear, resting at their rear ends on said platform and working in said sockets and toward their forward ends embracing said forward stops, sliding thimbles in the yokes, and a removable key passing through the key-opening in the drawbar and through the thimbles, and sliding in said draft-sill guide-openings, for the purpose set forth.

OLOF ANDERSON.

In presence of—
 JESSIE F. PIERCE,
 J. E. FORSYTH.